3,149,549
ADAPTER FOR SECURING ACCESSORIES TO A CAMERA
Norman D. Schroth, 1705 E. Wood, Decatur, Ill.
Filed June 20, 1963, Ser. No. 289,290
2 Claims. (Cl. 95—86)

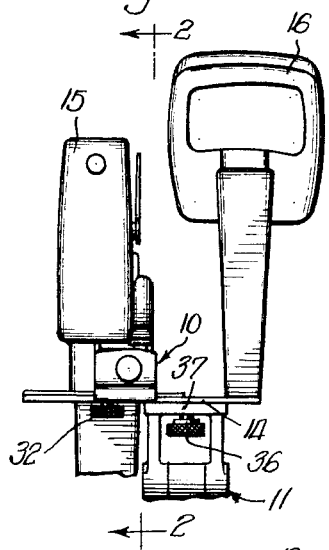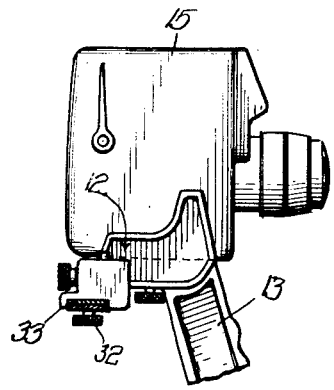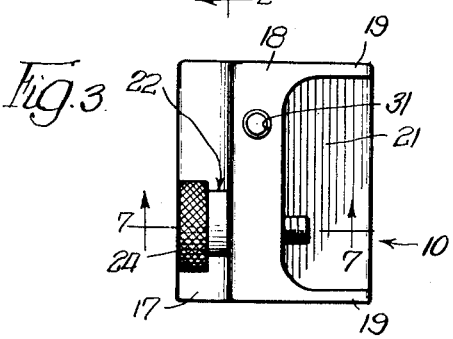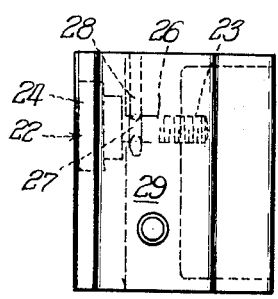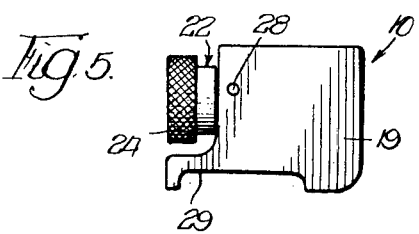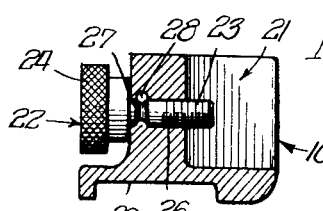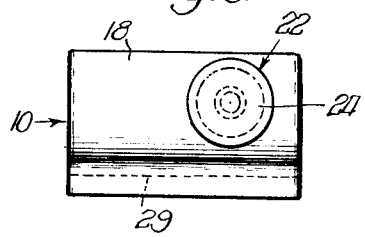
INVENTOR.
Norman D. Schroth

United States Patent Office 3,149,549
Patented Sept. 22, 1964

This invention relates to adapters and more particularly to a mounting adapter for the pistol grip of a movie camera.

It is an object of this invention to provide an adapter for the pistol grip of a movie camera Still another object of the invention is to provide a mounting adapter for a camera which is simple in construction, low in cost, and readily adaptable for use with a variety of different cameras.

A further object of the invention is to provide an adapter that can be employed to secure a lighting accessory to the pistol grip of a camera, which adapter is sufficiently small and compact so that the operation of a camera employing same is in no way inhibited.

An additional object of the invention is to provide an adapter that can also be employed to secure a movie camera and associated pistol grip to a suitable mounting structure such as a tripod or the like.

Other objects and advantages of the present invention will become apparent from the following detailed description when considered in conjunction with the accompanying drawing wherein:

FIGURE 1 is a rear elevational view which illustrates an adapter embodying the features of the present invention when functioning to secure a lighting accessory to the pistol grip of a camera of a conventional type;

FIGURE 2 is a cross-sectional view taken generally along the line 2—2 of FIGURE 1;

FIGURE 3 is an enlarged plan view which illustrates the upper surface of an adapter embodying the features of the present invention;

FIGURE 4 is an elevational view similar to FIGURE 3 but illustrating the bottom surface of the adapter;

FIGURE 5 is still another elevational view which illustrates the adapter when viewed from one end thereof;

FIGURE 6 is an elevational view depicting the rearward surface of the adapter; and FIGURE 7 is a cross-sectional view taken along the line 7—7 of FIGURE 3 which further illustrates various details of the adapter.

In general, a mounting adapter embodying the principle of the present invention is capable of securing a camera and pistol grip to a suitable mounting structure and/or of securing a conventional lighting accessory to the pistol grip. Preferably, the adapter includes a housing that has a cut-away section which is proportioned to mate with the rearward portion of the camera pistol grip. The housing is adapted to be secured to the rearward portion of the pistol grip by locking screw that extends through the housing. The housing also has a recessed portion that extends along one surface thereof and that is proportioned to receive the supporting portion of a mounting structure (e.g. a tripod) or the mounting segment of a lighting accessory which is to be secured to the camera. A receiving slot extends through the housing from the recessed portion thereof to adjacent the cut-away section. This receiving slot is designed to receive a locking screw that is provided either on the mounting segment of the lighting accessory or on the mounting structure.

Referring particularly to the drawings, an adapter, which is generally designated by the numeral 10 is illustrated when secured to the rearward portion 12 of a pistol grip 13 that is in turn mounted in a conventional manner in engagement with a movie camera 15. The adapter 10 is constructed so that a light bar 14 associated with a conventional camera lighting accessory 16 can be secured to the adapter and to the pistol grip for the movie camera and so that the entire assembly can be mounted upon a tripod 11.

Referring to FIGURES 4-7, the adapter 10 is a generally irregularly-shaped member in the form of a housing that is defined by a generally planar lower wall member 17, a wall member 18 that extends upwardly from the central portion of the wall member 17, and a pair of side wall members 19 that merge with the wall members 17 and 18 so as to define a cut-away section or mounting aperture 21.

In the illustrated embodiment, the cut-away section or mounting aperture 21 is formed with a generally U-shaped configuration. Further, the aperture 21 is proportioned to mate with the rearward portion 12 of the pistol grip 13 so that undesirable movement of the adapter relative to the pistol grip is precluded when the adapter is secured thereto, as hereinafter described.

As shown particularly in FIGURES 3 and 7, a locking screw 22 of conventional type extends through the wall member 18 so that the threaded end portion 23 thereof projects into the cut-away section 21. More particularly, the locking screw 22 preferably has a knurled gripping knob 24 that is secured to a central unthreaded mounting segment 26. Preferaly, a section 27 of the central mounting segment 26 is of reduced diameter so that a mounting pin 28 is received therein when the locking screw is positioned in the adapter. The mounting pin 28, which is placed in the wall member 18 during the formation of the adapter 10, precludes the locking screw from being moved in an axial direction, but accommodates rotary or threading movement thereof.

As is the usual case with commercially available movie camera pistol grips, the rearward portion of the pistol grip 12 is provided with a threaded aperture (not shown) which can accommodate the locking screw 22. Accordingly, when the adapter 10 is properly positioned adjacent the pistol grip and is suitably aligned therewith, rotary motion imparted to the knob 24 results in the locking screw being threaded into the aperture so that the adapter becomes positively secured to the pistol grip. Thereafter, a pistol grip so provided with the adapter 10 can readily accommodate the light bar 14 and/or be suitably mounted on the tripod 11.

In this connection and as shown in FIGURES 4 and 5, the wall member 17 has an elongated generally rectangular recessed portion 29 formed in the lower surface thereof. The recessed portion 29 is proportioned to receive either a mounting segment of the light bar 14 or the supporting portion of the tripod 11. For example, to facilitate the securing of the light bar to the adapter, a threaded receiving slot 31 is provided in the housing. The threaded receiving slot 31 extends through the housing and, more particularly, through the wall member 18 from the recessed portion 29 to a location adjacent the cut-away section 21. The receiving slot 31 is proportioned to receive a locking screw 31 (FIGURES 1 and 2) provided on the mounting segment 30 of the light bar. When the light bar is properly positioned in the recessed portion 29, the locking screw is threaded into the slot 31 thereby securing the bar to adapter. Inasmuch as the recessed portion 29 extends along the entire surface of the wall member 17, light bars 14 of various lengths can be accommodated therein, and the lighting appliance 16 can be slectively positioned the desired distance from the camera 15.

In the illustrated embodiment (FIGURES 1 and 2), the pistol grip 13 employing the adapter 10 and the lighting accessory are shown mounted on the tripod 11. This mounting is effected by threading another locking screw 36, which extends through an upper supporting plate 37 provided by the tripod 11, into a receiving slot (not shown) provided in the light bar 14 that is in turn supported on the plate 37. However, it should be understood that the adapter 10 can be secured directly to the tripod 11 when it is desired to mount the camera and pistol grip thereon, for example, when no lighting accessory is used with the camera.

The adapter 10 of the present invention is compact in construction and yet provides a positive means for securing a light bar to the pistol grip of a movie camera and/or for mounting a camera and pistol grip on a connectional tripod. Moreover, the adapter insures that a positive and structurally stable connection is made between the various parts, while at the same time not inhibiting the desired operation of the camera or of the lighting appliance utilized therewith.

It should be understood that the foregoing is illustrative of but one preferred embodiment of an adapter, which, in accordance with the present invention, can be utilized to positively secure a lighting appliance to the pistol grip of a movie camera and/or mount the camera on a suitable supporting structure. It should be understood that when the adapter is employed with various models of cameras, slight modifications in the dimensions and/or position of the members employed therein might be required. Such necessary and incidental modifications of, or variations in, the adapter structure would be obvious to one skilled in the art and would not constitute a departure from the invention as set forth in the following claims.

What is claimed is:

1. In combination with a hand pistol grip for a camera, an adapter for securing a light bar to said pistol grip, which adapter comprises a housing having a cut-away section proportioned to mate with said pistol grip, said housing having an aperture extending therethrough in a first direction, the aperture provided in said housing being alignable with a threaded aperture that is provided in said pistol grip, a locking screw extending through said aperture, said locking screw having a central mounting portion and a threaded end portion, means mounted within said housing and communicating with said aperture provided therein for engaging the central mounting portion of said screw so that said screw is maintained within said housing for rotary movement relative thereto and so that the threaded end portion thereof extends beyond said aperture, said housing having a recessed portion that extends therethrough in a second direction, said recessed portion being proportioned to receive the mounting segment of said light bar, and a threaded receiving slot extending through said housing from the recessed portion thereof to adjacent the cut-away section thereof and in a third direction transversely of said locking screw receiving aperture, saild receiving slot being proportioned to receive a locking screw provided on the mounting segment of said light bar.

2. In combination with a hand pistol grip for a camera, an adapter for securing a light bar to said pistol grip, which adapter comprises a housing having a cutaway section proportioned to mate with said pistol grip, said housing having an aperture extending therethrough, said aperture provided in said housing being alignable with a threaded aperture that is provided in said pistol grip, a locking screw extending through said aperture, means for maintaining said locking screw within said housing for rotary movement relative thereto, said housing having a recessed portion therein that is proportioned to receive the mounting segment of said light bar, and a threaded receiving slot extending through said housing from the recessed portion thereof to adjacent the cutaway section thereof, said receiving slot being proportioned to receive a locking screw mounted on the mounting segment of said lighting bar.

References Cited in the file of this patent
UNITED STATES PATENTS 2,551,753 McCullough _____ May 8, 1951
2,614,471 Markowitz _____ Oct. 21, 1952